Patented July 10, 1934

1,966,371

UNITED STATES PATENT OFFICE 1,966,371

PROCESS FOR THE PREPARATION OF PURE BERYLLIUM COMPOUNDS

Walter Zisch, Frankfort-on-the-Main, and Gustav Jaeger, Neu-Isenburg, Germany, Luise Zisch, administratrix of said Walter Zisch, deceased, assignors to Deutsche Gold- und Silber-Scheideanstalt vormals Roessler, Frankfort-on-the-Main, Germany, a corporation No Drawing. Application July 16, 1932, Serial No. 623,016. In Austria July 31, 1931

19 Claims. (Cl. 23—15)

The object of our invention is a process for the separation of beryllium oxide from aluminium oxide and other metal oxides starting from materials which contain these elements especially from the mineral beryl for the purpose of obtaining a pure beryllium oxide and other beryllium compounds.

According to the processes hitherto known the starting materials containing beryllium were heated in such a way that the bases of the silicates present were converted into compounds soluble in acids. In this way a separation from the silica was made possible which was achieved by subsequently treating the melt with suitable acids, whereby all the bases were dissolved whilst the silicic acid remained undissolved. The heating itself was carried out by heating in the presence of an excess of oxides of the alkali metals or alkaline earth metals or the carbonates of the same elements. The subsequent treatment of the reaction product consisted in heating with acid until all the basic components were converted into salts and the silicic acid was deposited in an insoluble state. This working procedure resulted in all cases in an aqueous solution which contained in addition to alkali metal or alkali earth metal compounds the beryllium in conjunction with the total aluminium, iron and the like in the form of their compounds. Numerous methods were known for working up these solutions in order to gain the beryllium compounds in a pure state. None, however, has yielded satisfactory results.

According to our invention we are able to separate the beryllium practically completely from the accompanying elements adulterating it, in particular from aluminium and iron. We have found that by heating the starting material containing beryllium with compounds of the alkaline earth metals or, in some cases, with mixtures of these compounds with compounds of the alkali metals in a special proportion, it is possible to obtain a reaction product which contains the beryllium originally present in a form which surprisingly is insoluble in acid. If this product is treated with diluted acids substantially the total beryllium oxide and a part of the silicic acid remain undissoved whilst aluminium oxide and other metal oxides which may be present such as chromium oxide, iron oxide and others simultaneously with another part of the silicic acid are dissolved.

We have found it essential for carrying through our process to take for the heating of the beryllium containing starting materials such as, for instance the mineral beryl or other ores, calcium oxide in a proportion of about 9 to 13 molecules for each molecule of beryl, in order to convert the beryllium present as far as possible into the beryllium oxide insoluble in acid. We have further found that the quantity of beryllium oxide which remains undissolved passes through an optimum when 11 to 12 molecules of calcium oxide are employed for the admixture. On the other hand, on increasing the proportion of calcium oxide to beryl to more than 12 to 1, above all if the proportion is greater than 13 molecules results are obtained which are of no practical use any more.

In the place of calcium oxide other compounds of the alkaline earths may be used for the fusion as long as they are converted by the heating into oxide. Such compounds are, for instance, carbonates, hydroxides, nitrates, organic salts such as acetates of the alkaline earth and the like. In certain cases mixtures of these compounds may be employed. For carrying out the fusion we heat the mixture, for instance, to temperatures of about 800 to 1200° centigrade or higher.

The compounds of the alkaline earths utilized for the fusion of the starting materials containing beryllium may be replaced according to our invention to a certain extent by compounds of the alkali metals such as oxides, hydroxides or carbonates for instance, soda carbonate. We found it useful to employ for instance, a mixture of about 6 to 20 equivalents of calcined soda carbonate to 6 to 24 equivalents of the oxide or the carbonate respectively of the alkaline earth. Of this mixture preferably more than 15 equivalents to each one molecule or beryl or the starting material containing beryllium are used. The amount of the fusion mixture to be added should, however, not exceed about 32 to 36 equivalents to each molecule of beryl present. Otherwise, there is a risk that the beryllium oxide is dissolved when the melt is subsequently treated with acid. We found it particularly useful to add about 25 to 30 equivalents to obtain the best results.

In carrying out the heating the mixture is maintained at the temperature mentioned above of say 800 to 1200° centigrade, for about 1 to 6 hours. The heating temperatures and the duration of the heating most favorable for each particular case can be ascertained without difficulty by means of a preliminary experiment. The heating may be carried out indirectly in muffles or crucible furnaces or directly in pit kilns, tube furnaces or revolving tubes or by mixing with coal and ignition with introduction of air.

The beryllium is present in the reaction mixture thus obtained in a form which is soluble in acid only with great difficulty or which is not soluble at all. Its form is most likely a beryllium oxide and may be separated from the aluminium, iron, calcium and other compounds which are present in the heated or sintered product in a soluble form by dissolving through treatment with suitable acids. Such acids are, for instance, hydrochloric acid, nitric acid, acetic acid, formic acid and the like which are capable of dissolving the aluminium, iron, chromium and other compounds and which do not form insoluble compounds with the latter elements. Unsuitable therefore are, for instance, sulfuric acid, hydrofluoric acid, phosphoric acid and the like which form insoluble compounds with the alkaline earths, aluminium and the like.

The acids are applied preferably in such concentrations that the portion of the silicic acid which goes into solution does not cause any difficulties when the solution is filtered. In other words, the silicic acid which is dissolved should be diluted to such an extent that the solution may be filtered without difficulty and does not gelatinize so that the solution either can not be filtered at all or with great difficulty only.

The residue remaining undissolved when the reaction mixture is treated with acid is then treated in the ordinary way in order to remove the silicic acid and to gain the beryllium. It may, for instance, be mixed with coal and chlorinated and the silicon chloride and beryllium chloride generated thereby may be collected in fractions. The residue may also be treated with concentrated sulfuric acid whereby the beryllium oxide is converted into sulphate. The latter may be extracted with water whereby the silicic acid remains undissolved. A further way of working up the residue is the so called Hagelund process in accordance to which the residue is mixed with pyrites and carbon and heated. Finally, the mixture may be treated with organic acid and the organic salts of the beryllium formed thereby distilled off.

*Example I*

540 grs. Beryl (=1 molecule) are mixed with 1100 grs. calcium carbonate (=11 molecules) and heated during 2 hours to 1200° centigrade. The reaction product is pulverized and introduced into an excess of hydrochloric acid of a concentration of 7%. The remaining residue is filtered off. It was obtained: a residue of 91.5 grs. which consists substantially of beryllium oxide and silicic acid with about 61% BeO. This residue is heated with concentrated sulfuric acid whereupon the beryllium oxide is converted into beryllium sulphate which then is separated from the silicic acid by lixiviation with water. From the beryllium sulphate solution the beryllium hydroxide is obtained by precipitation with alkali or ammonia respectively. After filtration and ignition the yield is 56 grs. of BeO. As according to the analysis 64 grs. had to be expected this corresponds to a yield of 85%.

*Example II*

1080 grs. Beryl with a content of 11% beryllium oxide are heated with a mixture of 1060 grs. of soda carbonate and 1800 grs. calcium carbonate to about 1000° centigrade and this temperature is maintained for 2 to 3 hours. 2.04 kgrs. of the reaction product are agitated with 14 ltrs. of hydrochloric acid containing about 6.7% HCl for 1 hour and the fraction remaining undissolved is filtered off. 223 grs. of a mixture consisting substantially of silicic acid and beryllium oxide remain undissolved. This mixture is treated with 240 cc. of concentrated sulfuric acid and heated until the sulfuric acid begins to fume. The reaction product which now consists of beryllium sulphate and silicic acid is entered into water, boiled therewith and the beryllium sulphate solution is then separated from the silicic acid by filtration. By precipitation with ammonia 85.5 grs. beryllium oxide are obtained from the solution instead of 89 grs. calculated which corresponds to a yield of 96%.

What we claim is:

1. A process for the preparation of pure beryllium compounds from materials containing, in addition, alumina and silicic acid which consists in converting the berylium present into beryllium oxide insoluble in dilute acid, treating the reaction product with a dilute acid which is capable of forming soluble salts with ammonia alkaline earths, and iron, separating the solution from undissolved silica and beryllium oxide and separating the two latter compounds.

2. A process for the preparation of pure beryllium compounds from materials containing, in addition, alumina and silicic acid which consists in converting the beryllium present into beryllium oxide insoluble in dilute acid by heating the starting material with oxide of alkaline earths in suitable proportions treating the reaction mass with a dilute acid which is capable of forming soluble salts with ammonia alkaline earths, and iron, separating the solution from silica and beryllium oxide remaining undissolved and separating the two latter compounds.

3. A process for the preparation of pure beryllium compounds from materials containing, in addition, alumina and silicic acid which consists in converting the beryllium present into beryllium oxide insoluble in dilute acid by heating the starting material with calcium oxide in proportions of nine to thirteen molecules to each one molecule of beryl present in the starting material, treating the reaction mass with a dilute acid which is capable of forming soluble salts with ammonia, alkaline earths and iron, separating the solution from silica and beryllium oxide remaining undissolved and separating the two latter compounds.

4. A process for the preparation of pure beryllium compounds from materials containing, in addition, alumina and silicic acid which consists in converting the beryllium present into beryllium oxide insoluble in dilute acid by heating the starting material with calcium oxide in proportions of eleven to twelve molecules to each one molecule of beryl present in the starting material, treating the reaction mass with a dilute acid which is capable of forming soluble salts with ammonia, alkaline earths and iron, separating the solution from silica and beryllium oxide remaining undissolved and separating the two latter compounds.

5. A process for the preparation of pure beryllium compounds from materials containing, in addition, alumina and silicic acid which consists in converting the beryllium present into beryllium oxide insoluble in dilute acid by heating the starting material with calcium compounds furnishing calcium oxide during the heating process in a proportion of nine to thirteen molecules to each one molecule of beryl present in the starting material, treating the reaction mass with a dilute acid which is capable of forming soluble salts with ammonia, alkaline earths and iron, separating the solution from silica and beryllium oxide remaining undissolved and separating the two latter compounds.

6. A process for the preparation of pure beryllium compounds from materials containing, in addition, alumina and silicic acid which consists in converting the beryllium present into beryllium oxide insoluble in dilute acid by heating the starting material with calcium compounds yielding calcium oxide during the heating process in quantities of nine to thirteen molecules to each one molecule of beryl present to temperatures of 800° to 1200° centigrade, treating the reaction mass with a dilute acid which is capable of forming soluble salts with ammonia, alkaline earths and iron, separating the solution from silica and beryllium oxide remaining undissolved and separating the two latter compounds.

7. A process for the preparation of pure beryllium compounds from materials containing, in addition, alumina and silicic acid which consists in converting the beryllium present into beryllium oxide insoluble in dilute acid by heating the starting material with alkaline earths compounds yielding oxides during the heating process in proportions of nine to thirteen molecules to each three molecules of beryllium oxide present treating the reaction mass with a dilute acid which is capable of forming soluble salts with ammonia, alkaline earths and iron, separating the solution from silica and beryllium oxide remaining undissolved and separating the two latter compounds.

8. A process for the preparation of pure beryllium compounds from materials containing, in addition, alumina and silicic acid which consists in converting the beryllium present into beryllium oxide insoluble in dilute acid by heating the starting material with a mixture of six to twenty four equivalents of alkaline earth oxides with six to twenty equivalents of compounds of the alkaline metals of alkaline reaction to temperatures of about 800° to 1200° C. treating the reaction mass with a dilute acid which is capable of forming soluble salts with ammonia, alkaline earths and iron, separating the solution from silica and beryllium oxide remaining undissolved and separating the two latter compounds.

9. A process for the preparation of pure beryllium compounds from materials containing, in addition, alumina and silicic acid which consists in converting the beryllium present into beryllium oxide insoluble in dilute acid by heating the starting material with from 15 to 36 equivalents to each one molecule of beryl present, of a mixture containing 6 to 24 equivalents of alkaline earth oxide and 6 to 20 equivalents of alkaline compounds of alkali metals to 800 to 1200° centigrade treating the reaction mass with a dilute acid which is capable of forming soluble salts with ammonia, alkaline earths and iron separating the solution from silica and beryllium oxide remaining undissolved and separating the two latter compounds.

10. A process for the preparation of pure beryllium compounds from materials containing, in addition, alumina and silicic acid which consists in converting the beryllium present into beryllium oxide insoluble in dilute acid by heating the starting material with 25 to 30 equivalents to each three molecules of beryllium oxide present, of a mixture containing 6 to 24 equivalents of alkaline earth oxides and 6 to 20 equivalents of alkaline compounds of alkali metals to 800-1200° C., treating the reaction mass with a dilute acid which is capable of forming soluble salts with ammonia, alkaline earths and iron, separating the solution from silica and beryllium oxide remaining undissolved and separating the two latter compounds.

11. A process for the preparation of pure beryllium compounds from materials containing, in addition, alumina and silicic acid which consists in converting the beryllium present into beryllium oxide insoluble in dilute acid by heating the starting material with 15 to 36 equivalents to each three molecules of beryllium oxide present, of a mixture containing 6 to 24 equivalents of calcium oxide and 6 to 20 equivalents of soda carbonate to 800 to 1200° C., treating the reaction mass with a dilute acid which is capable of forming soluble salts with ammonia, alkaline earths and iron, separating the solution from silica and beryllium oxide remaining undissolved and separating the two latter compounds.

12. A process for the preparation of pure beryllium compounds from materials containing, in addition, alumina and silicic acid which consists in converting the beryllium present into beryllium oxide insoluble in dilute acid by heating the starting material with 15 to 36 equivalents to each three molecules of beryllium oxide present, of a mixture containing 6 to 24 equivalents of a calcium compound yielding calcium oxide in the course of the heating process and 6 to 20 equivalents of soda carbonate to 800–1200° C., treating the reaction mass with a dilute acid which is capable of forming soluble salts with ammonia, alkaline earths and iron, separating the solution from silica and beryllium oxide remaining undissolved and separating the two latter compounds.

13. A process for the preparation of pure beryllium compounds from materials containing, in addition, alumina and silicic acid which consists in converting the beryllium present into beryllium oxide insoluble in dilute acid by heating the starting material with 15 to 36 equivalents to each three molecules of beryllium oxide present, of a mixture containing 6 to 24 equivalents of a calcium compound yielding calcium oxide in the course of the heating process and 6 to 20 equivalents of sodium hydroxide to 800–1200° C., treating the reaction mass with a dilute acid which is capable of forming soluble salts with ammonia, alkaline earths and iron, separating the solution from silica and beryllium oxide remaining undissolved and separating the two latter compounds.

14. A process for the preparation of pure beryllium compounds from materials containing, in addition, alumina and silicic acid which consists in converting the beryllium present into beryllium oxide insoluble in dilute acid by heating the starting material with calcium oxide in proportions of nine to thirteen molecules to each one molecule of beryl present in the starting material, treating the reaction mass with a dilute acid capable of forming soluble salts with alumina, alkaline earths, iron, separating the solution from undissolved silicic acid and beryllium oxide and separating the two latter compounds.

15. A process for the preparation of pure beryllium compounds from materials containing, in addition, alumina and silicic acid which consists in converting the beryllium present into beryllium oxide insoluble in dilute acid by heating the starting material with calcium oxide in proportions of nine to thirteen molecules to each one molecule of beryl present in the starting material, treating the reaction mass with dilute hydrochloric acid, separating the solution from undissolved silicic acid and beryllium oxide and separating the two latter compounds.

16. A process for the preparation of pure beryllium compounds from materials containing, in addition, alumina and silicic acid which consists in converting the beryllium present into beryllium oxide insoluble in dilute acid by heating the starting material with from 15 to 36 equivalents to each one molecule of beryl present, of a mixture containing 6 to 24 equivalents of alkaline earth oxide and 6 to 20 equivalents of alkaline compounds of alkali metals to 800–1200° centigrade treating the reaction mass with dilute acid capable of forming soluble salts with alumina, alkaline earths and iron, separating the solution from undissolved silicic acid and beryllium oxide and separating the two latter compounds.

17. A process for the preparation of pure beryllium compounds from materials containing, in addition, alumina and silicic acid which consists in converting the beryllium present into beryllium oxide insoluble in dilute acid by heating the starting material with from 15 to 36 equivalents to each one molecule of beryl present, of a mixture containing 6 to 24 equivalents of alkaline earth oxide and 6 to 20 equivalents of alkaline compounds of alkali metal to 800–1200° centigrade treating the reaction mass with dilute hydrochloric acid, separating the solution from undissolved silicic acid and beryllium oxide and separating the two latter compounds.

18. A process for the preparation of pure beryllium compounds from materials containing, in addition, alumina and silicic acid which consists in converting the beryllium present into beryllium oxide insoluble in dilute acid by heating the starting material with calcium oxide in proportions of nine to thirteen molecules to each one molecule of beryl present in the starting material, treating the reaction mass with an acid capable of forming soluble salts with alumina, alkaline earths and iron of such concentration that gelatinization of silicic acid is avoided, separating the solution from undissolved silicic acid and beryllium oxide and separating the two latter compounds.

19. A process for the preparation of pure beryllium compounds from materials containing, in addition, alumina and silicic acid which consists in converting the beryllium present into beryllium oxide insoluble in dilute acid by heating the starting material with calcium oxide in proportions of nine to thirteen molecules to each one molecule of beryl present in the starting material, treating the reaction mass with hydrochloric acid of a concentration of 7 to 10 percent, separating the solution from undissolved silicic acid and beryllium oxide and separating the two latter compounds.

WALTER ZISCH.
GUSTAV JAEGER.